Aug. 7, 1956 H. K. ECKERT ET AL 2,757,797
WATER TREATMENT
Filed March 27, 1953
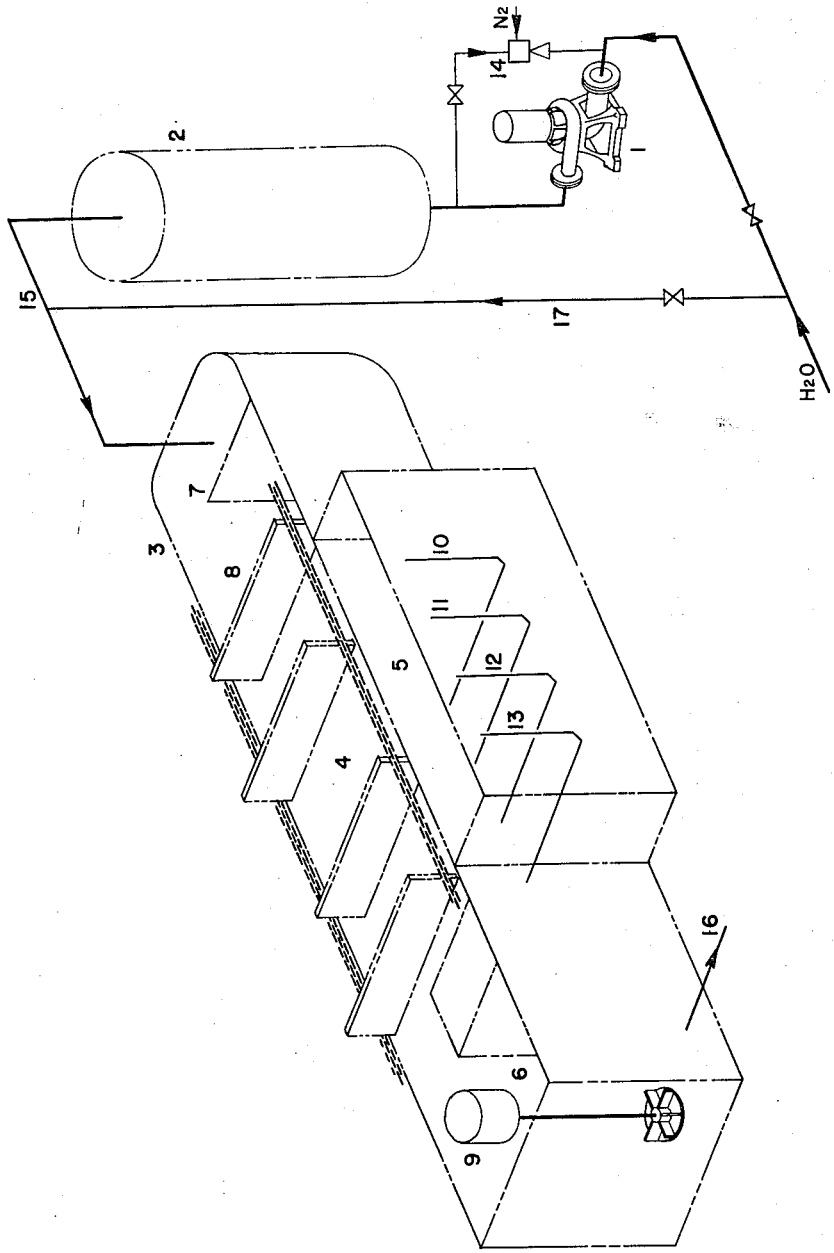
INVENTOR
Herman K. Eckert
John G. McQuarrie
BY
ATTORNEY

2,757,797
WATER TREATMENT

Herman K. Eckert and John G. McQuarrie, Texas City, Tex., assignors to Monsanto Chemical Company, St. Louis, Mo., a corporation of Delaware Application March 27, 1953, Serial No. 345,122

3 Claims. (Cl. 210—53)

This invention relates to a method for the removal of dispersed carbon from water.

Where water is available and can be used it is almost universally employed for cooling purposes. In many processes in the chemical industry, particularly those involving hydrocarbon combustion, pyrolysis or cracking, and the like, the process water employed, such as that used for quenching hot gases, for example, becomes contaminated with finely divided particles of carbon black or soot. Reuse or recycle of such water which is required for purposes of process economy is not feasible unless its carbon content can be maintained within specified limits since on each cycle an appreciable accumulation of carbon particles occurs.

A number of flotation processes have been developed and successfully exploited commercially for separating solids from liquids. In principle, flotation processes depend on the relative wettability of surfaces, a flotation system consisting of a liquid, a gas, and some particulate material, usually a solid ranging in size from somewhat less than 1 mm. to finer than one micron. This type of process is admirably suited to separate suspended carbon particles from water since the carbon is usually of micron size and often essentially unwettable. However, the successful operation of a flotation process requires a rather delicate balance of many variables. In some applications, e. g., the use of additive flocculants or chemical agents, as in the well known "froth" technique, is undesirable. In other cases, the effectiveness of utilizing dissolved gases for flotation is seriously lowered because the character of the sludge produced makes its disposal an extremely difficult or, in some cases, almost impossible task. Water containing suspended carbon black derived from an acetylene process, for example, is not amenable to treatment by the latter type of technique. Such sludge is "meringue-like" in character and defies all attempts at disposal by the usual means of pumping from the collecting or recovery basin to a disposal or storage area, thus nullifying any advantages obtained up to this stage in the use of the flotation technique proper.

It is an object of this invention, therefore, to provide an improved process for clarifying water.

It is a further object of the invention to provide an improved process for treating water which removes carbon black or so-called soot therefrom and at the same time renders said carbon black readily disposable.

It is a still further object of the invention to provide an improved process for treating water to remove carbon black or soot therefrom which is not influenced by pH or temperature changes and produces a carbon black sludge which can be readily handled or disposed of.

Other objects and advantages will become apparent from the following description of the invention.

According to the invention, "sooty" water, i. e., water contaminated with finely divided particles of carbon, is clarified by passing the water, containing dispersed gas under pressure, into a degasification chamber where flotation is accomplished by a decrease in pressure which causes release of the gas in extremely minute bubbles which lift upward and concentrate the carbon particles maintaining them at the surface of the water over the entire area of the container. Clarified water is removed from the bottom of the flotation chamber by means of uniformly spaced recovery tubes discharging into a common collector. The floating carbon sludge is mechanically separated by means of scraper blades in the direction of a sludge recovery pit where the sludge is subjected to mechanical agitation before it is fed into the suction inlet of a sludge removal pump. For optimum results, a wetting agent may be added to the soot slurry during the agitation step.

The following example is illustrative of the process of the invention.

Example I

The separatory unit employed is sketched in the attached drawing. It consists of a pump 1, retention tank 2, and a flotation compartment 3 having a flotation chamber 4, a clarified water discharge chamber 5, and a sludge recovery chamber 6. The flotation chamber is equipped with a diffusion baffle and adjustable dam 7 for receiving the influent water and distributing it uniformly over the entire area of the chamber. It is also equipped with a set of mechanically operated scrapers 8 which move in the direction of the sludge recovery chamber. The chamber for the collection of carbon sludge 6, a basin or pit located at the end of the flotation chamber opposite the inlet, is equipped with a standard turbine-type agitator 9. The clarified water discharge chamber 5, a sump in which the clarified water is collected, is located alongside the flotation chamber and is connected thereto by means of outlet tubes 10, 11, 12, and 13 located several inches off the floor of the flotation chamber. These recovery tubes are equipped with adjustable height risers. Other necessary pumps, motor drives, etc., are those conventionally employed in the operations described.

A process water stream containing approximately 225 p. p. m. of carbon black derived from an acetylene process was pumped continuously by means of the pump 1 to the retention tank 2 of the separation unit described above at a flow rate of approximately 89,585 lbs. per hr. An amount of nitrogen equal to about 1% of the water by volume was introduced under pressure on the discharge side of the pump through a gas ejector 14 located on the suction side of the pump and operated by means of a small by-pass pressure stream of liquid from the discharge side of the pump. The water entered the retention tank at a temperature of 170° F. and was maintained under a pressure of 35 p. s. i. g. the same pressure under which the nitrogen was introduced into the stream. From the retention tank 2, the water was delivered, via the pipe 15, into the flotation chamber 4 where the pressure was released to approximately atmospheric. Approximately 164 lbs. per hr. of carbon black sludge, formed at the surface of the water, was continuously removed by the flight scrapers 8 into the sludge recovery chamber 6. In order to render the soot slurry, containing approximately 90% water, manageable or pumpable, it was treated in the sludge recovery chamber 6 with 0.002 part by weight of a polyoxyethylene ester wetting agent per part of slurry while being subjected to constant thorough agitation provided by means of the agitator 9 operated at a speed of about 85 R. P. M. The modified sludge was then fed through a pipe connection 16 in the bottom of the chamber to the suction inlet of a pump for conductance to a waste pit.

The clarified water recovered from the collection chamber 4 via the outlet tubes 10, 11, 12, and 13 near the bottom of the flotation chamber at a rate of 89,421 lbs./hr. contained, by analysis, less than 50 p. p. m.

of carbon black and was entirely suitable for re-use in the process.

While the process has been described specifically with reference to the removal of a specific type of carbon black from water, it is equally adaptable to the removal of any type of soot or dispersed carbon from water.

Operation may be either on a batch or continuous basis.

Although the example given uses injected inert gas for flotation, it is not always necessary to inject air or inert gases into the contaminated water before it enters the flotation chamber. In processes where water requiring treatment is used for cooling or quenching and as a result, already contains dispersed or dissolved gases under slight pressure, such water may be fed directly into the flotation chamber by gravity flow. A by-pass arrangement using line 17 for such optional operation is shown in the attached drawing. The term dispersed is used here and in the appended claims in its generic sense, i. e., the gas may be diffused throughout the water in small, almost microscopic, bubbles as a separate phase, or it may be dissolved in actual physical solution so that there is only a single homogenous phase.

Any inert gas may be utilized to obtain flotation—air, nitrogen, methane, etc. Preferably, however, air is employed, except in cases where oxygen presents any hazard. The inert gas is introduced at pressures ranging generally from 1 to 50 p. s. i. g., but preferably from 10 to 25 p. s. i. g.

Appreciable variation in flows and solids concentration may occur without impairing the efficiency of the process. However, the velocity of flow of raw water should be kept sufficiently low, when opposed to the upward motion of gas-buoyed particles, to allow the rise of these particles to the surface.

The outlet level at which the treated water leaves the flotation chamber determines the operating depth of the unit and consequently the recovery depth of the scrapers. For optimum efficiency, outlet level should be maintained at that depth (or height) where the minimum concentration of suspended carbon exists.

Flows, levels, etc., can be easily adjusted, automatically if desired, to provide maximum removal of suspended carbon with a minimum loss of water.

Suitable wetting agents for modifying the sludge to facilitate its removal from the recovery chamber include natural soap, alkyl aryl sulfonates of which sodium dodecylbenzenesulfonate is a particular example, sulfated fatty alcohols, alkyl sulfonates, sulfated esters and acids, amide sulfates and sulfonates, fatty esters of glycerol and glycol and other polyhydric alcohols such as sorbitol, the condensation products of ethylene oxide with fatty acids, abietic acid, alkyl phenols such as nonyl phenol, and mercaptans, such as tert.-dodecyl mercaptan, etc., as well as mixtures of these and/or other surface-active agents. Only small amounts of the wetting agent are required. Quantities ranging from 0.1 to 1% by weight of the soot slurry to be treated provide efficient action. In most cases, depending upon the nature of the soot, the quantity of water in the slurry, etc., quantities from 0.1 to 0.3% by weight are adequate to modify the soot slurry sufficiently to render it readily disposable.

What is claimed is:

1. A process for the removal of dispersed carbon black from water contaminated therewith which comprises introducing inert gas under a pressure in the range from 1 to 50 p. s. i. g. into said water, degasifying said treated water in a flotation tank by releasing pressure to approximately atmospheric pressure so that the majority of suspended particles are separated from the solution and rise to the surface of the water forming a sludge thereon, removing said sludge into a sludge-collecting basin by means of mechanical scrapers, treating said sludge in said sludge-collecting basin with a polyoxyethylene ester in an amount in the range from about 0.1% to about 1% by weight of the soot slurry treated while subjecting it to constant agitation, feeding said modified sludge to the suction inlet of the sludge-removal pump, and withdrawing clarified water from said flotation tank at a level where the minimum concentration of said suspended carbon exists.

2. A process for the removal of dispersed carbon black from water contaminated therewith which comprises introducing air under a pressure in the range from 1 to 50 p. s. i. g. into said water, degasifying said treated water in a flotation tank by releasing pressure to approximately atmospheric pressure so that the majority of suspended particles are separated from the solution and rise to the surface of the water forming a sludge thereon, removing said sludge into a sludge-collecting basin by means of mechanical scrapers, treating said sludge in said sludge-collecting basin with a polyoxyethylene ester in an amount in the range from about 0.1% to about 1% by weight of the soot slurry treated while subjecting it to constant agitation, feeding said modified sludge to the suction inlet of the sludge-removal pump, and withdrawing clarified water from said flotation tank at a level where the minimum concentration of said suspended carbon exists.

3. A process for the removal of dispersed carbon black from water contaminated therewith which comprises introducing nitrogen under a pressure in the range from 1 to 50 p. s. i. g. into said water, degasifying said treated water in a flotation tank by releasing pressure to approximately atmospheric pressure so that the majority of suspended particles are separated from the solution and rise to the surface of the water forming a sludge thereon, removing said sludge into a sludge-collecting basin by means of mechanical scrapers, treating said sludge in said sludge-collecting basin with a polyoxyethylene ester in an amount in the range from about 0.1% to about 1% by weight of the soot slurry treated while subjecting it to constant agitation, feeding said modified sludge to the suction inlet of the sludge-removal pump, and withdrawing clarified water from said flotation tank at a level where the minimum concentration of said suspended carbon exists.

References Cited in the file of this patent

UNITED STATES PATENTS

| Number | Name | Date |
|---|---|---|
| 1,388,868 | Jones et al. | Aug. 30, 1921 |
| 1,591,725 | Mumford | July 6, 1926 |
| 1,717,223 | Karlstrom | June 11, 1929 |
| 1,828,646 | Dantsizen | Oct. 20, 1931 |
| 1,982,129 | Wells et al. | Nov. 27, 1934 |
| 2,005,742 | Hines | June 25, 1935 |
| 2,171,853 | Kurtzbein | Sept. 5, 1939 |
| 2,219,781 | Lowe | Oct. 29, 1940 |
| 2,317,139 | Franz | Apr. 20, 1943 |
| 2,436,375 | Booth et al. | Feb. 24, 1948 |
| 2,585,659 | Kilpatrick | Feb. 12, 1952 |